Oct. 7, 1947.  L. D. NORDSTRUM  2,428,634
LIQUID COOLED DYNAMO-ELECTRIC MACHINE FOR ABSORBING ENERGY
Original Filed Oct. 26, 1943  2 Sheets-Sheet 1
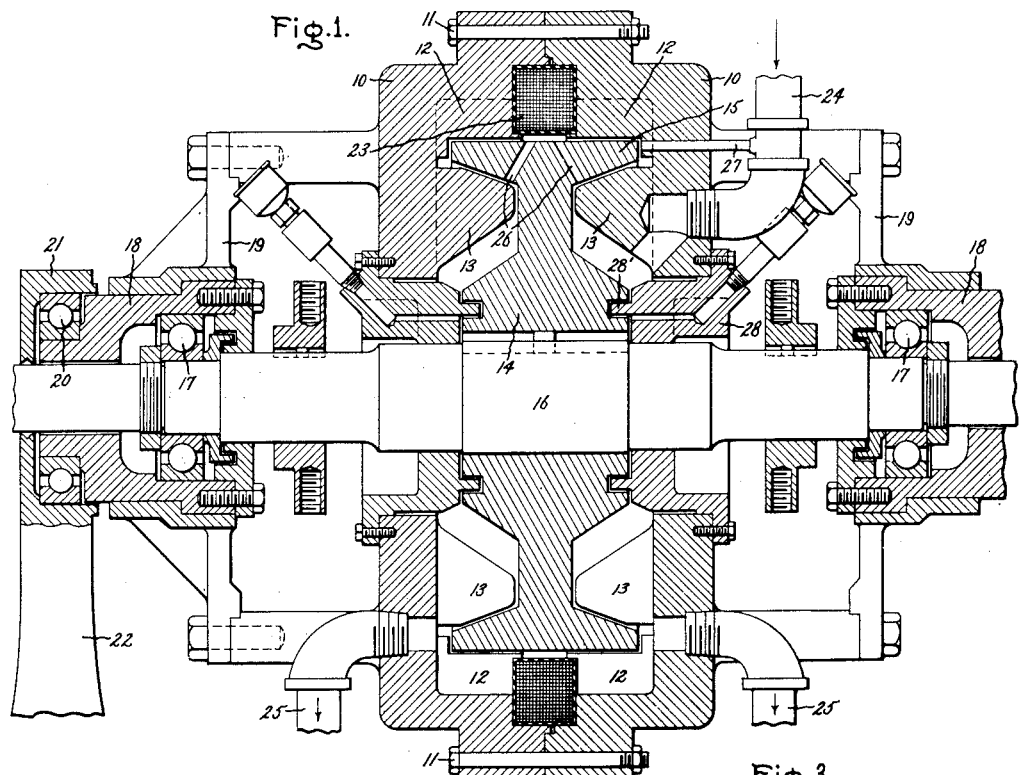
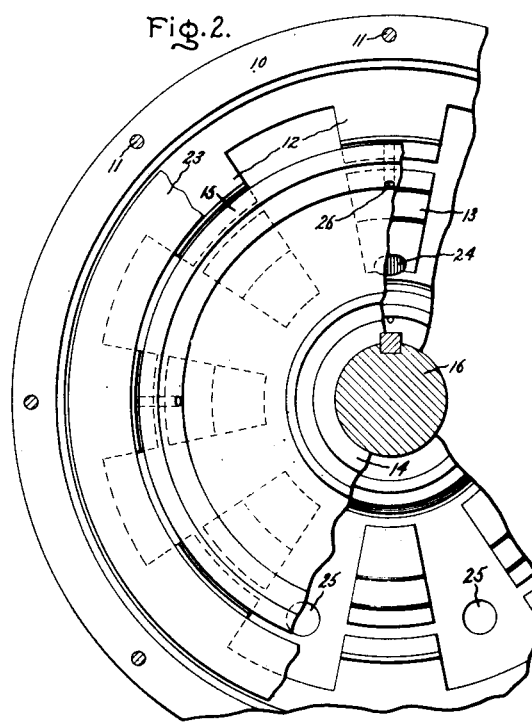
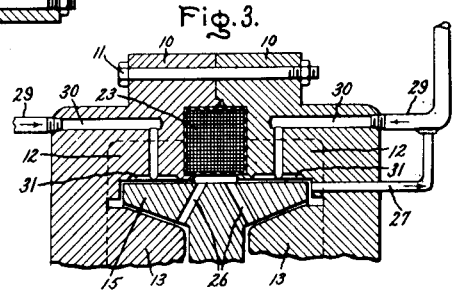
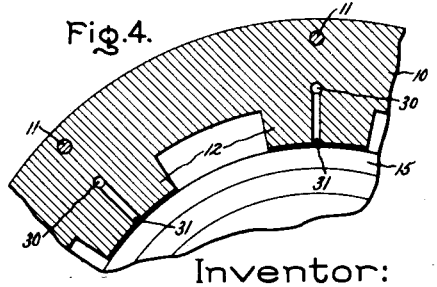
Inventor:
Lauren D. Nordstrum, Deceased,
by Gertrude O. Nordstrum,
Administratrix,
by Harry E. Dunham
His Attorney.

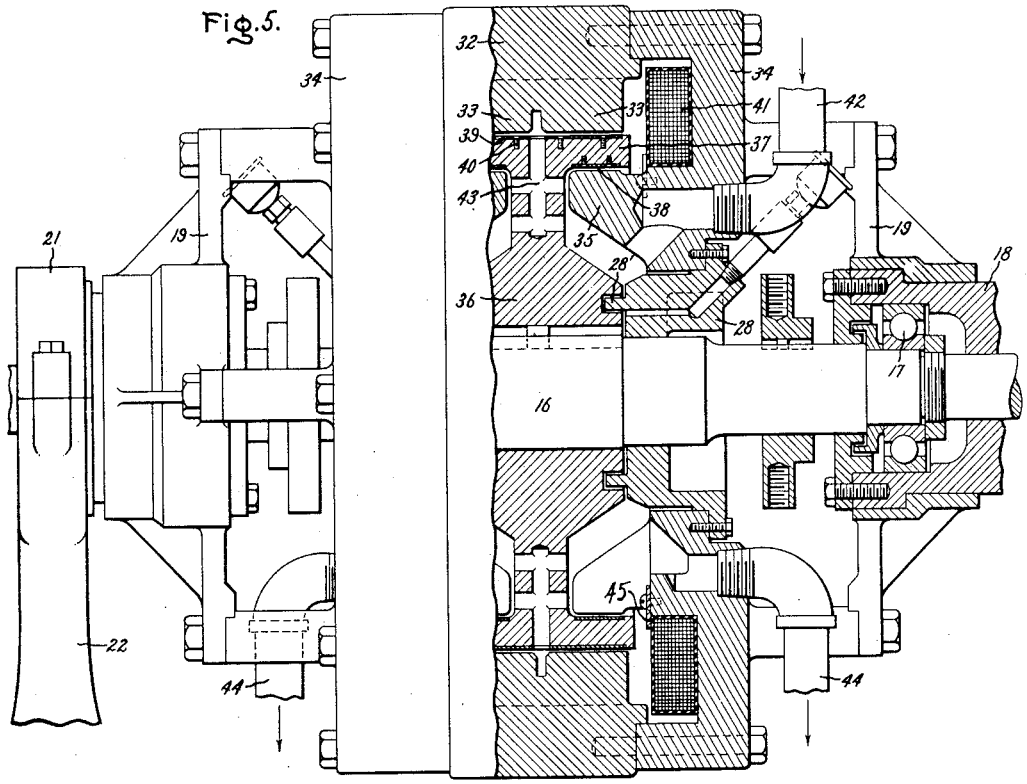

Patented Oct. 7, 1947

2,428,634

UNITED STATES PATENT OFFICE 2,428,634

LIQUID COOLED DYNAMOELECTRIC MACHINE FOR ABSORBING ENERGY

Lauren D. Nordstrum, deceased, late of Fort Wayne, Ind., by Gertrude O. Nordstrum, administratrix, Fort Wayne, Ind.; said administratrix assignor to General Electric Company, a corporation of New York Continuation of application Serial No. 507,707, October 26, 1943. This application filed June 13, 1945, Serial No. 599,168

6 Claims. (Cl. 188—104)

This invention relates to dynamoelectric machines and particularly to eddy current induction dynamometers which are adapted to be cooled by liquid.

This application is a continuation of the copending forfeited application Serial No. 507,707, on Dynamoelectric machine, filed October 26, 1943, and assigned to the assignee of this application.

An object of this invention is to provide an improved dynamoelectric machine which is cooled by the circulation of cooling liquid directly in contact with surfaces of the relatively rotatable members of the machine.

Another object of this invention is to provide an improved eddy current dynamoelectric machine with a liquid cooling system adapted to circulate cooling liquid in contact with the eddy current surfaces of the machine.

Further objects and advantages of this invention will become apparent and the invention will be better understood from the following description referring to the accompanying drawings, and the features of novelty which characterize the invention will be pointed out with particularity in the claims annexed to and forming part of this specification.

In the drawings, Fig. 1 is a side elevation view, partly in section, illustrating an eddy current induction dynamometer provided with an embodiment of the invention; Fig. 2 is an end view, partly broken away, of the machine shown in Fig. 1; Fig. 3 is a sectional side elevational view of a part of a machine embodying a modification of the arrangement shown in Fig. 1; Fig. 4 is a fragmentary partial sectional end view showing the cooling liquid supply arrangement incorporated in the machine illustrated in Fig. 3; Fig. 5 is a side elevational view, partly in section, illustrating a dynamoelectric machine embodying a further modification of the invention; and Fig. 6 is an end view of the machine shown in Fig. 5, partly broken away.

Referring to the drawing, an embodiment of the invention is shown adapted to an eddy current induction dynamometer of the absorption type provided with two relatively rotatable members, one of which is relatively stationary and includes two similar half portions 10 formed of magnetic material and secured together by a plurality of circumferentially spaced apart through bolts 11. These members 10 are each formed with a pair of radially spaced apart toothed sections having a plurality of teeth 12 and 13 which are circumferentially spaced apart on the inner side of the machine. The radial relationship of these two sets of teeth provides a space between which an eddy current member is adapted to rotate. This member is formed as the other relatively rotatable member of the machine and includes a spider and hub portion 14 with an axially extending relatively thin flange 15 formed about the outer edge thereof which extends between the toothed portions 12 and 13. This member is mounted on a shaft 16 which may be made of non-magnetic material to prevent shunting of the flux around the air gap between the teeth 12 and 13, and this shaft is supported by anti-friction ball bearings 17 mounted in a bearing housing 18 formed in the end shields 19 which support the other relatively rotatable members. The bearing housings 18 are rotatably supported by antifriction ball bearings 20 in bearing housings 21 formed in pedestals 22 arranged at each end of the machine so as to rotatably support the entire machine. A field exciting winding 23 is mounted about the flange portion 15 of the inner member and is arranged between the two sections 10 of the relatively stationary member. This winding is adapted to provide magnetic excitation to both relatively rotatable members, such that when the shaft 16 is driven, the flange portion 15 will rotate between the teeth 12 and 13 and cut the magnetic flux passing between these parts of the toothed member into the flange 15 from one side of the machine to these same respective elements on the other side of the machine, thereby generating eddy currents in the flange portion 15 and absorbing energy in the form of heat in this member. Cooling liquid, such as water, is adapted to be supplied to the interior of the machine through a flexible pipe connection 24, and this cooling liquid is adapted to be circulated over and through the flange member 15 and to be drained from the casing through exhaust pipe connections 25 at the lower portion of the machine. In order to assist the circulation of the cooling liquid and to provide more intimate contact between the cooling liquid and the flange portion 15, a plurality of outwardly extending passages 26 are formed through the flange portion 15. This makes the flange portion 15 in effect an impeller member and creates a higher liquid pressure on the outside of this member in the air gap between the teeth 12 and the flange portion 15. Circulation of the cooling liquid also is increased by providing a recirculating liquid connection 27 which extends from adjacent the outer edge of the flange member 15 near the air gap to the cooling liquid supply connection 24, such that the pressure within the machine adjacent the outer edge of the flange portion 15 causes the flow of cooling liquid through the connection 27 into the inlet connection 24 and assists in forcing this liquid into the interior of the machine. Sealing glands 28 are arranged adjacent each end of the relatively stationary member and are formed with labyrinth sealing portions 28' to minimize the passage of cooling liquid outwardly along the shaft from the interior of the machine. These sealing glands preferably are formed of nonmagnetic material in order to minimize the shunting of the flux as much as possible through these glands and the shaft 16. This provides an efficient cooling system for an eddy current induction type machine, since the cooling liquid is brought into direct contact with the heated surface, thereby providing for a relatively quick transfer of the generated heat into the cooling medium, and only a relatively small cooling liquid pressure is required to inject the cooling liquid into the machine because of the improved recirculating injector action of the connection 27 together with the impeller construction of the eddy current flange portion 15.

In Figs. 3 and 4, another modification of the invention is shown in which the same basic elements as those shown in Fig. 1 are provided, although the cooling system is slightly different. In this arrangement, the machine is provided with cooling liquid supply connections 29 which supply cooling liquid to passageways 30 formed in the relatively stationary member, and this cooling liquid is injected into the air gap between the relatively rotatable members through axially extending grooves 31 formed in the interior surfaces of the teeth 12 so as to supply the cooling medium directly onto the outer smooth eddy current surface of the relatively thin flange portion 15. The same recirculating injector connection 27 as that used in Fig. 1 may also be utilized in this construction to increase the efficiency of the cooling system.

In Figs. 5 and 6 another embodiment of the improved machine is shown in which two relatively rotatable members are provided, one of which is relatively stationary and includes an annular central member 32 formed of magnetic material and provided with two sets of axially spaced apart toothed portions 33 formed with circumferentially spaced apart teeth and securely connected to end members 34 formed of magnetic material and having a plurality of circumferentially spaced apart teeth 35 spaced radially from the toothed portions 33. The other relatively rotatable member also is formed of magnetic material and is provided with a web and hub portion 36 and an outer double flange portion 37 which extends between the toothed portions 33 and 35 of the other relatively rotatable member. The surfaces of the flange portion 37 adjacent the toothed portions 33 and 35 are faced with a material of relatively low resistance in the form of copper plates 38 and 39 having relatively smooth surfaces and secured to the cylindrical surfaces of the flange portion 37 in any suitable manner, as by screws 40. An exciting winding 41 is held in position on each side of the machine by plates 45 to provide magnetic excitation to both relatively rotatable members of the machine such that the magnetic flux tends to pass from the toothed portion 33, through the flange portion 37, to the toothed portion 35 and around through the body portions 34 and 32, such that rotation of the flange portion 37 between the toothed portions generates relatively high eddy currents in the low resistance elements 38 and 39. These eddy curernts absorb energy and transform this energy into heat losses tending to raise the temperature of the flange portion 37. Efficient operation of the machine is obtained by cooling this member with a cooling liquid supplied to the interior of the machine by a suitable flexible connection 42 and circulating this cooling liquid through the air gaps over the eddy current elements 38 and 39 and through the supporting flange portion by providing outwardly extending passages 43 through the flange portion 37, so that this part of the machine is in effect a liquid impeller which circulates the liquid through the machine. The warmed cooling liquid is removed from the machine through a suitable drain connection 44. The relatively rotatable parts of the machine are rotatably supported adjacent each end thereof by suitable bearing constructions such as those disclosed in Fig. 1.

While there are illustrated and described particular embodiments of the invention, modifications thereof will occur to those skilled in the art. It should be understood, therefore, that the invention is not to be limited to the particular arrangements disclosed, and it is intended in the appended claims to cover all modifications which do not depart from the spirit and scope of the invention.

What is claimed as new and desired to be secured by Letters Patent of the United States, is:

1. An induction dynamoelectric machine having two relatively rotatable members, one of said members having a portion formed of magnetic material with toothed sections having a plurality of teeth extending toward the other of said members, the other of said members having a section of magnetic material and a relatively smooth eddy current surface portion arranged adjacent said toothed sections with air gaps therebetween, means including a field exciting winding for magnetically exciting both of said members, means for supplying cooling liquid to the interior of said machine, said other member being constructed and arranged to circulate said cooling liquid through said air gap, and means for recirculating cooling liquid from said air gap to said cooling liquid supply means for increasing the circulation of the liquid.

2. An eddy current induction dynamoelectric machine having two relatively rotatable members, one of said members having a portion formed of magnetic material with toothed sections having a plurality of teeth extending toward the other of said members, the other of said members having a section of magnetic material and a relatively smooth eddy current surface portion of relatively low resistance material formed as a relatively thin flange arranged adjacent said toothed sections with air gaps therebetween, means including a field exciting winding for magnetically exciting both of said members, and means for supplying cooling liquid to the interior of said machine, said other member being constructed as an impeller for circulating said cooling liquid through said air gap in contact with said eddy current surface.

3. An eddy current induction dynamoelectric machine having two relatively rotatable members, one of said members having a portion formed of magnetic material with radially spaced apart toothed sections having a plurality of teeth extending toward the other of said members, the other of said members having a section of magnetic material formed as a relatively thin flange arranged between and adjacent said toothed sections with air gaps therebetween, means including a field exciting winding for magnetically exciting both of said members, means for supplying cooling liquid to the interior of said machine, said other member being constructed as an impeller for circulating said cooling liquid through said air gap and over said flange, and means for recirculating cooling liquid from said air gap to said cooling liquid supply means for increasing the circulation of the liquid.

4. An induction dynamoelectric machine having two relatively rotatable members, one of said members having a portion formed of magnetic material with toothed sections having a plurality of teeth extending toward the other of said members, the other of said members having a section of magnetic material and a relatively smooth eddy current surface portion formed as a relatively thin flange arranged between and adjacent said toothed sections with air gaps therebetween, means including a field exciting winding for magnetically exciting both of said members, means for supplying cooling liquid to the interior of said machine, said other member being constructed as an impeller for circulating said cooling liquid through said air gap, and means for recirculating cooling liquid from said air gap to said cooling liquid supply means for increasing the circulation of the liquid.

5. An eddy current induction dynamoelectric machine having two relatively rotatable members, one of said members having a portion formed of magnetic material with a toothed section having a plurality of teeth extending toward the other of said members, the other of said members having a section of magnetic material and a relatively smooth eddy current surface portion arranged adjacent said toothed section with an air gap therebetween, means including a field exciting winding for magnetically exciting both of said members, means for supplying cooling liquid to the interior of said machine, said other member being constructed and arranged to circulate said cooling liquid through said air gap, and means for recirculating cooling liquid from said air gap to said cooling liquid supply means for increasing the circulation of the liquid.

6. An eddy current induction dynamoelectric machine having two relatively rotatable members, one of said members having a portion formed of magnetic material with toothed sections having a plurality of teeth extending toward the other of said members, the other of said members having a section of magnetic material formed as a relatively thin flange arranged between and adjacent said toothed sections with air gaps therebetween, means including a relatively thin smooth surface element on each side of said flange formed of relatively low resistance material for the generation of high eddy currents therein, means including a field exciting winding for magnetically exciting both of said members, means for supplying cooling liquid to the interior of said machine, said other member being constructed as an impeller for circulating said cooling liquid through said air gap and over said low resistance element for cooling said elements, and means for recirculating cooling liquid from said air gap to said cooling liquid supply means for increasing the circulation of the liquid.

GERTRUDE O. NORDSTRUM,
*Administratrix of the Estate of Lauren D. Nordstrum, Deceased.*

REFERENCES CITED

The following references are of record in the file of this patent:

UNITED STATES PATENTS

| Number | Name | Date |
| --- | --- | --- |
| 2,367,163 | Winther | Jan. 9, 1945 |
| 2,188,398 | Bernard | Jan. 30, 1940 |
| 1,779,797 | Baum | Oct. 28, 1930 |
| 1,691,696 | Baum | Nov. 13, 1928 |

FOREIGN PATENTS

| Number | Country | Date |
| --- | --- | --- |
| 418,443 | Great Britain | Oct. 22, 1934 |